March 8, 1960  F. H. ELLSWORTH  2,927,954
SHIELDED OIL WELL CABLE
Filed Sept. 27, 1956
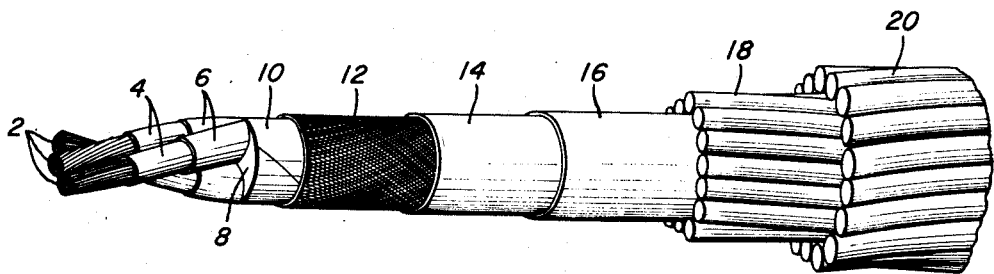
INVENTOR
FRANK H. ELLSWORTH,
By: Donald G. Dalton
his Attorney.

United States Patent Office 2,927,954
Patented Mar. 8, 1960

2,927,954

SHIELDED OIL WELL CABLE

Frank H. Ellsworth, Worcester, Mass., assignor to United States Steel Corporation, a corporation of New Jersey Application September 27, 1956, Serial No. 612,428

1 Claim. (Cl. 174—108)

This invention relates to an electric cable and a shielding composition therefor and more particularly to a cable to be used in determining the characteristics of the strata at various levels in a deep oil well. Because of the high pressures and temperatures in deep oil wells and because of the water and oil and other materials which are present in the well it is necessary that the shielding composition bond well with the other materials in the cable and also be strong enough to retain continuity when subjected to abrading action during normal handling of the cable. The shielding compositions previously used for this purpose were either too weak, bonded poorly or were expensive.

It is therefore an object of my invention to provide an oil well cable utilizing a shielding composition which bonds well, has relatively high strength and is inexpensive.

This and other objects will be more apparent after referring to the following specifications and attached drawing, in which:

The single figure is a view of a well logging cable with parts broken away.

Referring more particularly to the drawings, reference numeral 2 indicates electrical conductors or strands each of which is made up of seven bright copper wires laid with a left hand lay. Insulating material 4 surrounds each of the conductors 2. The insulating material 4 is preferably a thermosetting or thermoplastic elastomer as for example polymerized vinyl chloride and vinyl acetate suitably plasticized, stabilized, compounded and then applied about each of the conductors by processes well known in the art. An electrical shielding compound 6 surrounds the insulating material 4 on each conductor 2. The purpose of the shielding composition is to overcome the electrostatic field between the conductors and to develop zero direct capacity. The shielding composition is a mixture of 8 to 12% by weight of carbon particles, 7 to 14% by weight of castor oil, 18 to 25% by weight of resin and 49 to 67% by weight of alcohol. The carbon particles may be of graphite, carbon black, or mixtures of these substances of such size that they will pass through a 40-mesh screen. The carbon particles give the composition a semi-conducting characteristic. The castor oil is a plasticizer for the resin. The resin is preferably the by-product in the manufacture of abietic acid from natural pine resins such as that sold under the trade name "Vinsol" resin by Hercules Powder Co. The exact composition of "Vinsol" resin is not critical. The "Vinsol" resin is a dark colored resin having a high softening point between 230° and 240° F. The resin must be not more than slightly soluble in hydrocarbons and soluble in alcohol. The alcohol serves as a carrier or vehicle for the plasticized resin and carbon. The alcohol is preferably isopropyl alcohol of 91% concentration but methanol, ethanol and higher molecular weight alcohols such as propyl, butyl, amyl and their isomers and mixtures may also be used. A specific mixture found to be suitable contains 10.9% carbon, 10.6% castor oil, 21.3% of "Vinsol" resin and 57.2% isopropyl alcohol, all percentages being by weight. The shielding composition may be applied to the insulated strands either before or during the stranding of the insulated strands or conductors 2. The three covered conductors 2 are twisted together with a left hand lay and a filler material 8 such as glass is laid in the interstices or valleys between the conductors 2. A binder 10 of cotton or similar material is helically wound about the conductors 2 and fillers 8 with a relatively long lay so as to hold these elements compactly together and to obtain a circular construction. Braid 12, such as white rayon, surrounds the binder 10. A layer of clear paraffin 14 may surround the rayon braid 12 if desired and a semi-conducting shielding layer 16 surrounds the paraffin 14 or the braid 12 if no paraffin is used. The shielding layer 16 is of the same composition as the layer 6. A first layer of eighteen armor wires 18 surrounds the shielding compound and a second layer of eighteen armor wires 20 surrounds the first layer 18. The wires in the two layers are laid with opposite lay and it is preferred that the wires in the first layer be right lay and those in the second layer left lay. It will be understood that other types of insulating materials may be used in the cable and that certain layers may be omitted in certain cases. The number of conductors in the cable may also vary.

While one embodiment of my invention has been shown and described it will be apparent that other adaptations and modifications may be made without departing from the scope of the following claim:

I claim:

An oil well cable comprising a plurality of conductors twisted together, an insulating material surrounding each of said conductors, a shielding composition surrounding said insulating material, a filler in the valleys between the conductors, a binder surrounding said filler and conductors, a shielding composition surrounding said binder, and a layer of armor wires surrounding said last named shielding composition, said shielding composition consisting essentially of 8 to 12% by weight of carbon particles, 7 to 14% by weight of castor oil, 18 to 25% by weight of a resin which is the by-product in the manufacture of abietic acid from pine resins and 49 to 67% by weight of alcohol.

References Cited in the file of this patent

UNITED STATES PATENTS

| | | |
|---|---|---|
| 2,199,224 | Hughes | Apr. 30, 1940 |
| 2,234,068 | Wiseman | Mar. 4, 1941 |
| 2,273,518 | Gloor | Feb. 17, 1942 |
| 2,346,969 | Jeuck | Apr. 18, 1944 |
| 2,359,972 | De Bell | Oct. 10, 1944 |
| 2,446,387 | Peterson | Aug. 3, 1948 |
| 2,495,186 | Schulman | Jan. 17, 1950 |
| 2,604,509 | Blanchard | July 22, 1952 |

OTHER REFERENCES

"Organic Coating Techniques," (Book), Payne, vol. 1, 1954, John Wiley and Sons, Inc., New York, chapter 10.

"Hercules Products," (Publication), copyright 1948, Hercules Powder Company, Form 698 15M2-48, Wilmington 99, Delaware.

Synthetic and Applied Finishes, June 1935, pages 71, 72.